Nov. 30, 1937.　　　　　C. E. BAKER　　　　　2,100,465
VARIABLE SPEED TRANSMISSION UNIT
Filed Nov. 28, 1933　　　6 Sheets-Sheet 1
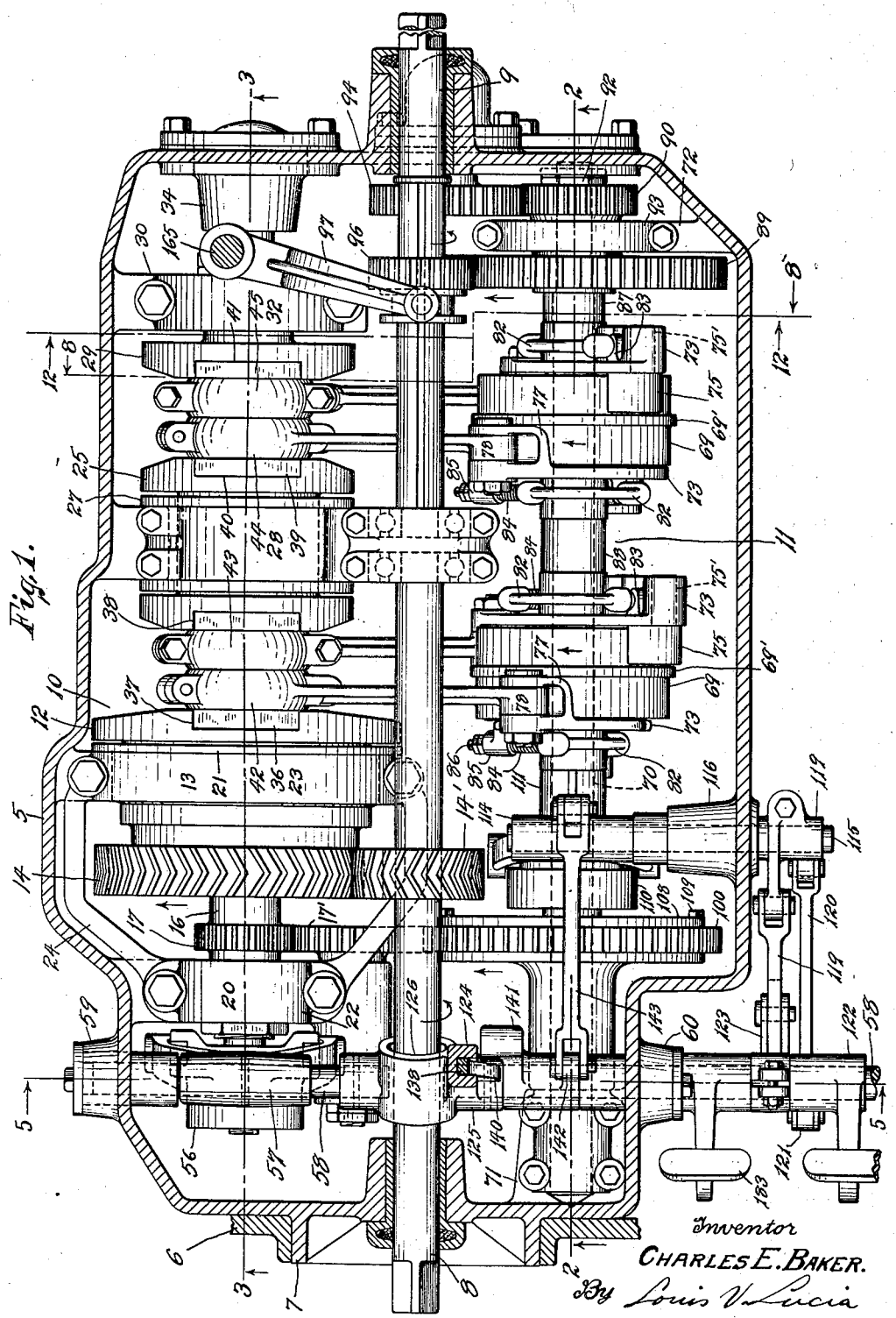
Inventor
CHARLES E. BAKER.
Attorney

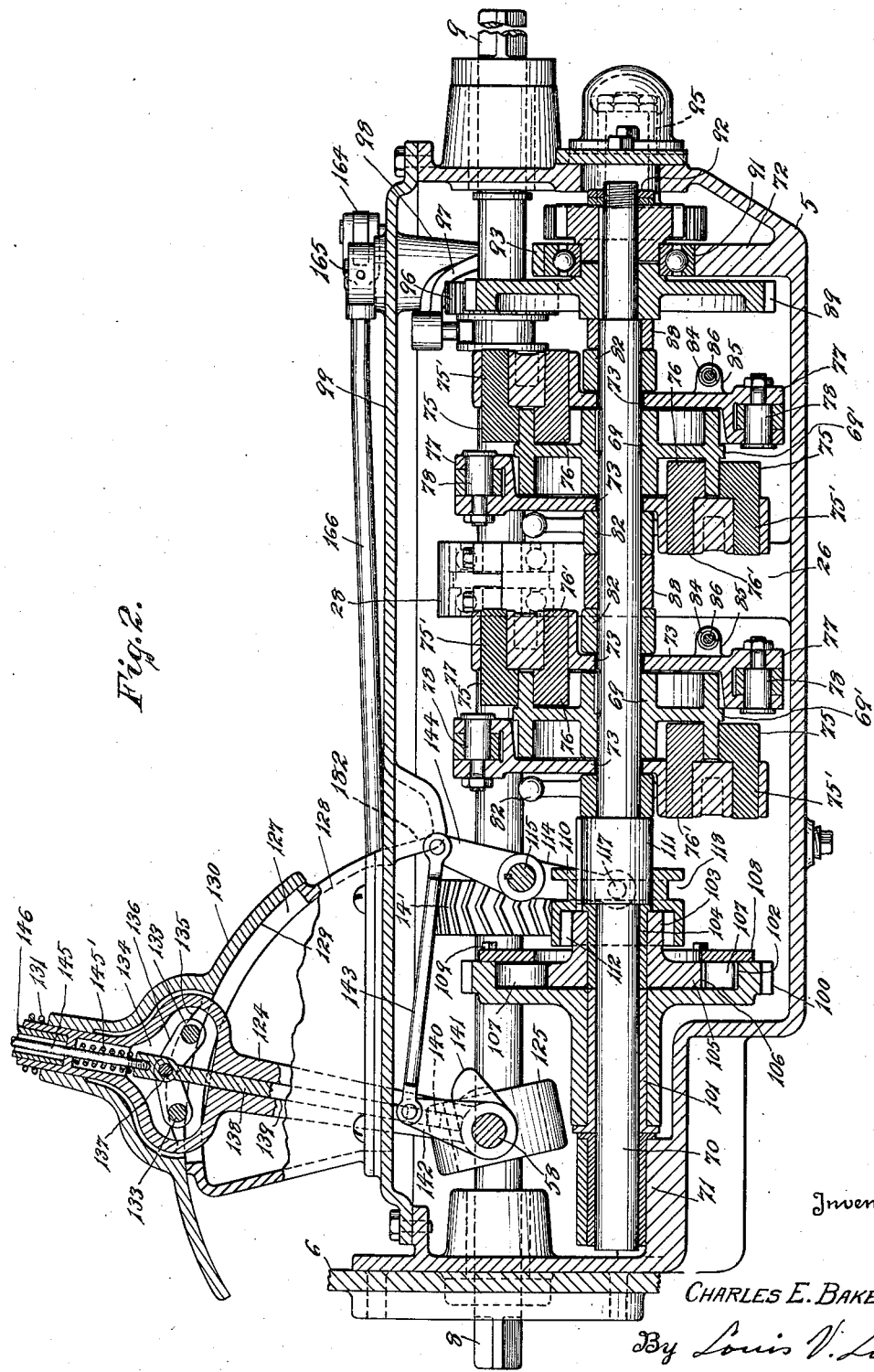

Nov. 30, 1937.   C. E. BAKER   2,100,465
VARIABLE SPEED TRANSMISSION UNIT
Filed Nov. 28, 1933   6 Sheets-Sheet 3
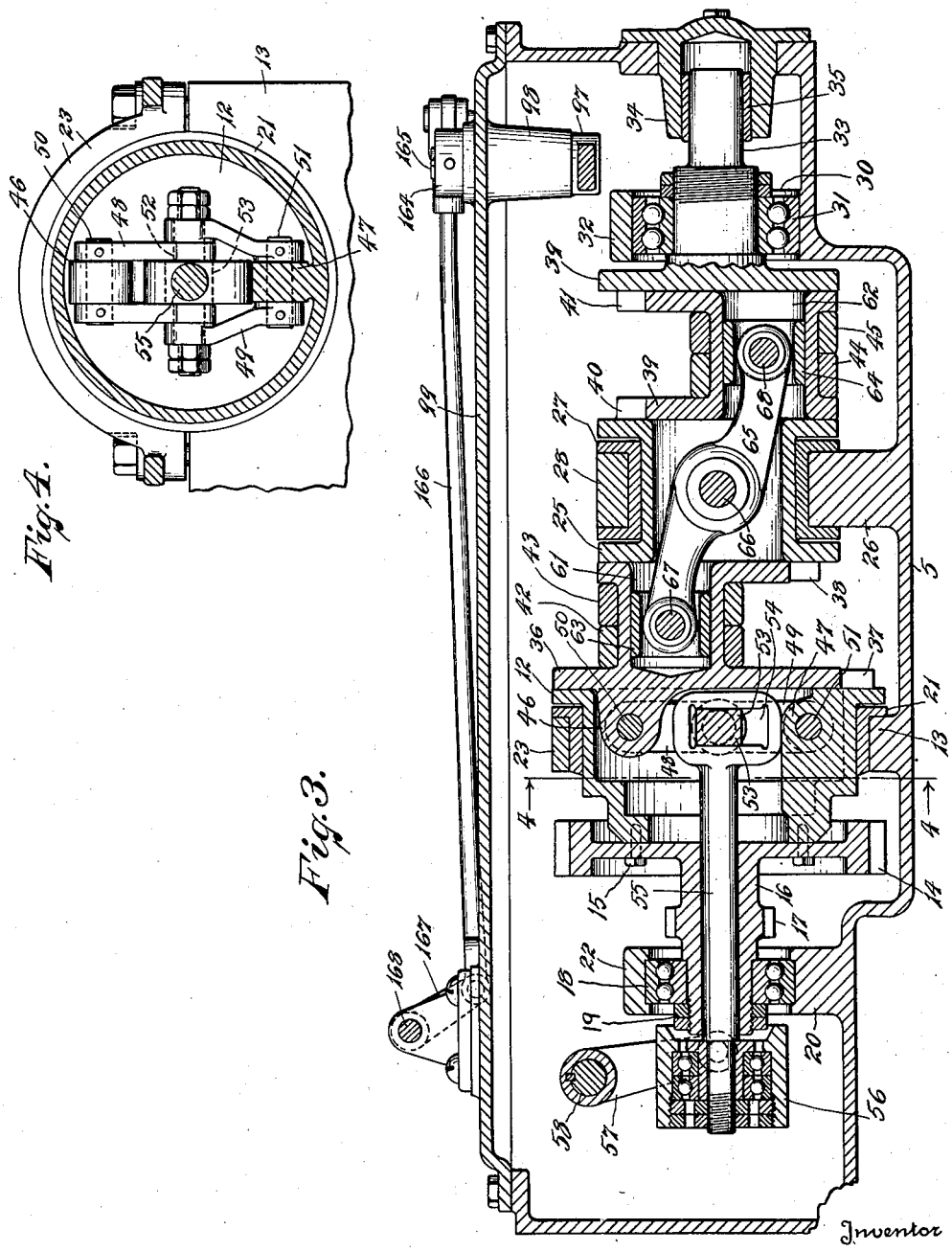
Inventor
CHARLES E. BAKER.
By Louis V. Lucia
Attorney

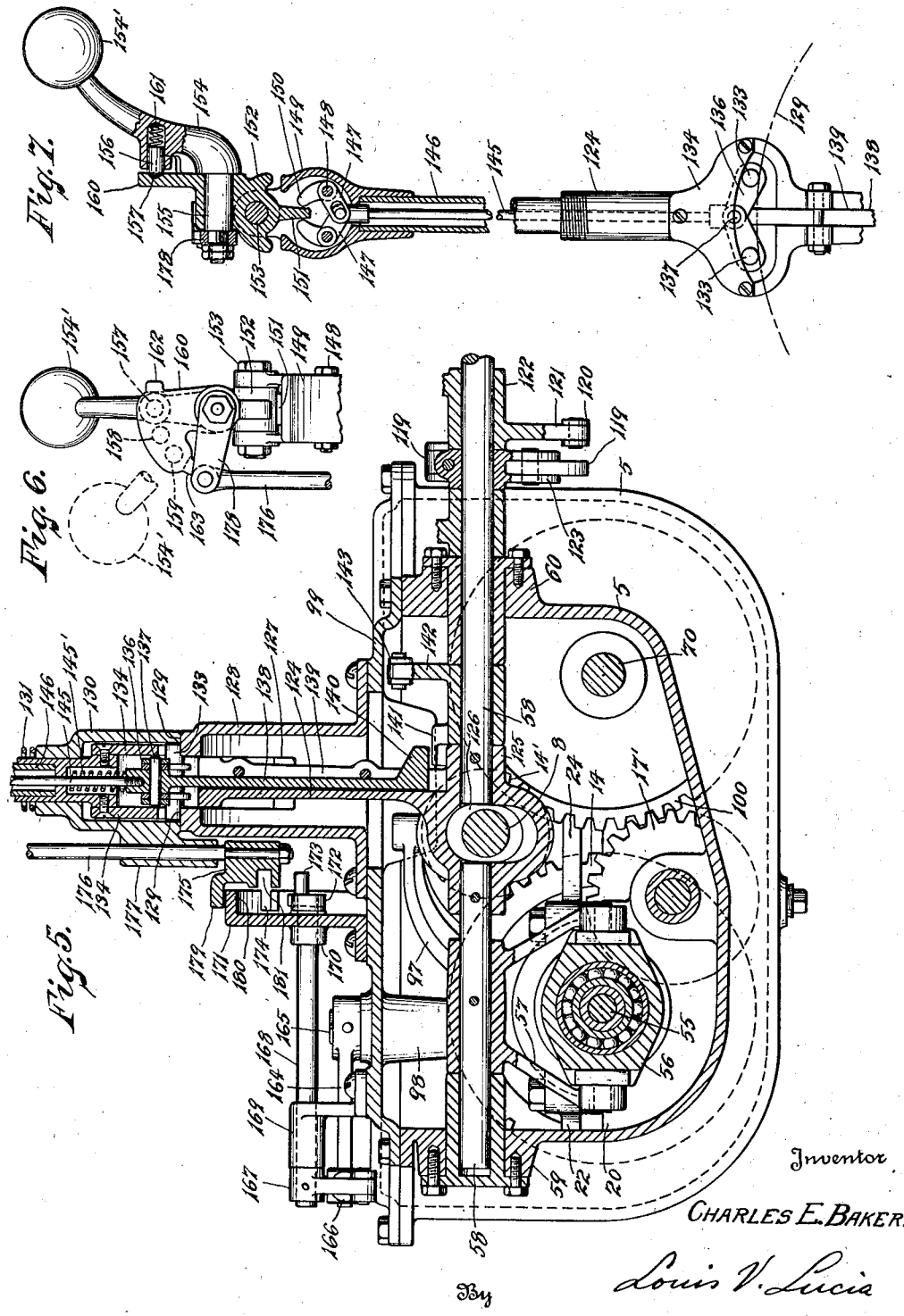

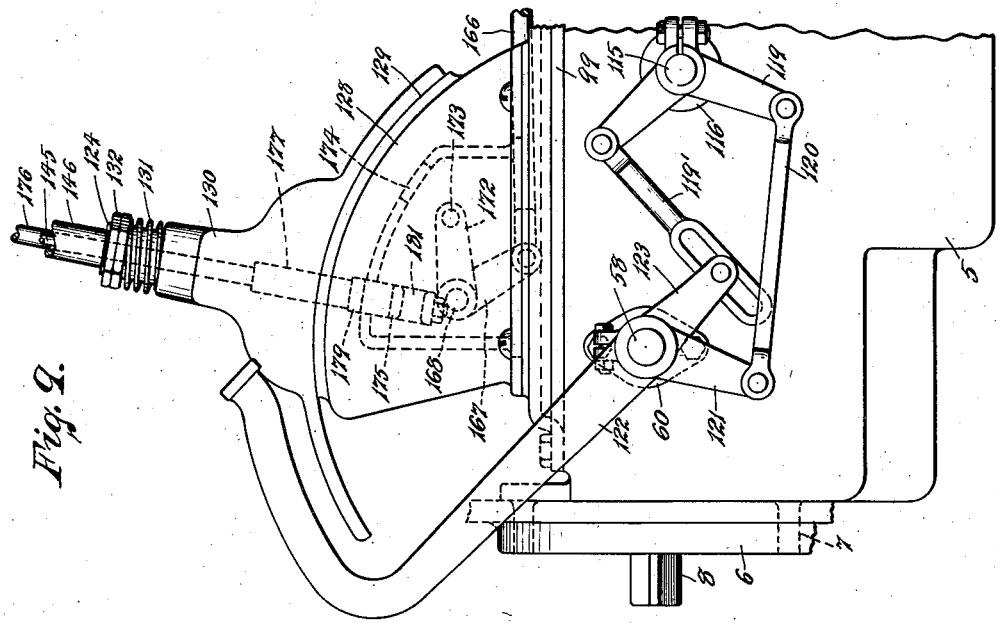
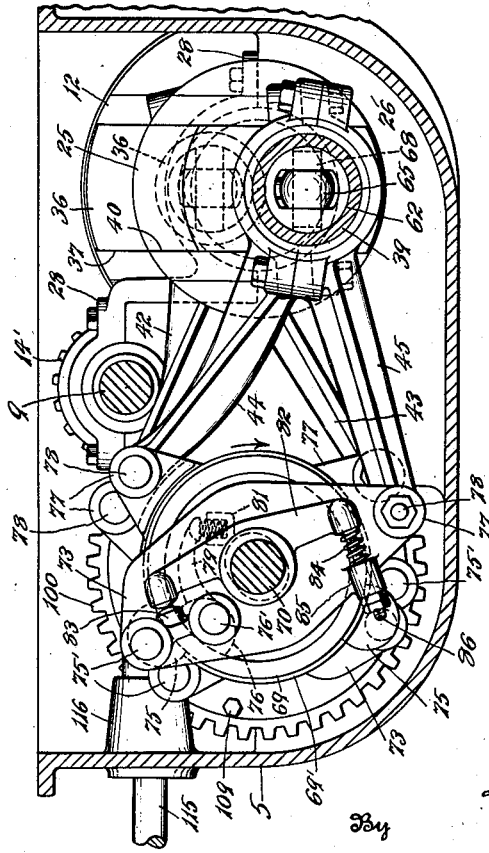
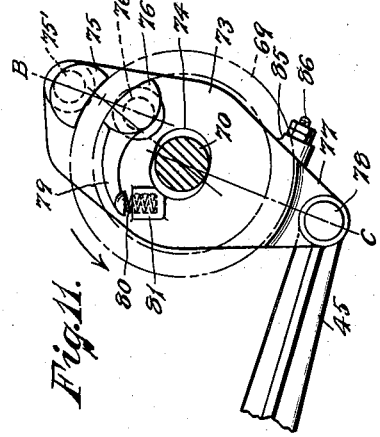

Nov. 30, 1937.  C. E. BAKER  2,100,465
VARIABLE SPEED TRANSMISSION UNIT
Filed Nov. 28, 1933  6 Sheets-Sheet 6
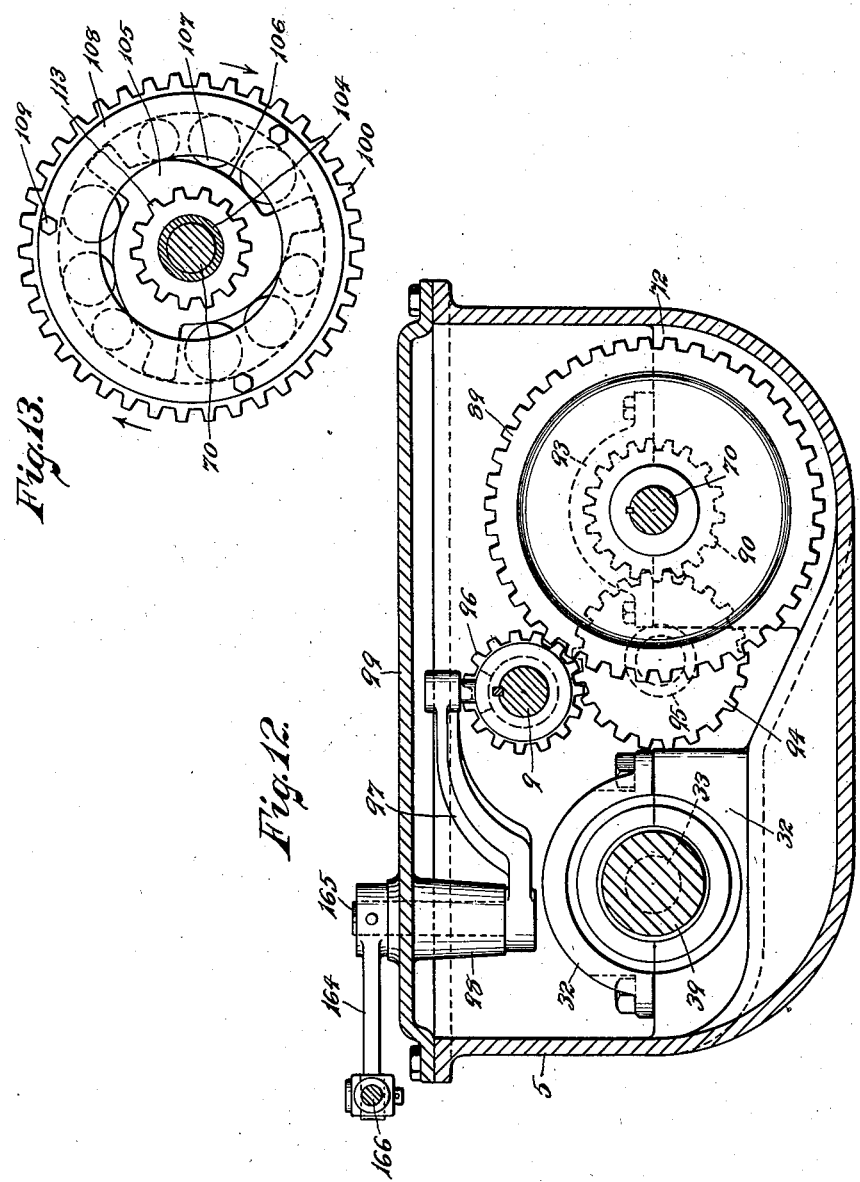
Inventor
CHARLES E. BAKER.
By Louis V. Lucia
Attorney Patented Nov. 30, 1937

2,100,465

UNITED STATES PATENT OFFICE 2,100,465

VARIABLE SPEED TRANSMISSION UNIT

Charles E. Baker, Wethersfield, Conn.

Application November 28, 1933, Serial No. 700,047

5 Claims. (Cl. 74—600)

This invention relates to improvements in power transmission devices such as commonly used on automobiles for transmitting power from the engine to the propeller shaft at variable speeds. The said devices being also applicable for use on machine tools as well as on other types of mechanisms where operation at different speeds is required.

An object of my invention is to provide a device for transmitting power from a driving member to a driven member, by means of which device the speed of rotation of the driven member with relation to that of the driving member may be varied at will to any degree, from zero to a speed greater than that of the driving member, without the customary shifting of gears or disengagement of other parts of the mechanism in the device.

A further object is to provide means whereby a yielding resistance is applied to the driven member for restricting the rotation thereof when the same is being driven by the momentum of the device to which it is connected or under such conditions as would occur when a vehicle is traveling down hill, at which time, said means provide a yielding braking action on the driving member.

A further object of my invention is to provide a simple means whereby the driven member may be rotated in a reverse direction in the same manner as in the forward direction without changing the operative relation of the principal units in the mechanism of said device.

Other objects, which may be attained by the novel mechanism of my improved transmission, will be understood from the following specification of my improved transmission and from the accompanying drawings thereof in which:

Figure 1 is a plan view showing my improved transmission mechanism in elevation with the operating lever and the housing thereof being shown in section.

Figure 2 is a side view thereof in vertical section on line 2—2 of Figure 1, some of the parts back of said line being omitted for the purpose of clearly illustrating the construction of the driving unit.

Figure 3 is a similar view through the cranking unit, on line 3—3 of Figure 1.

Figure 4 is a detail view on line 4—4 of Figure 3 illustrating the construction of the crank adjusting toggle mechanism.

Figure 5 is a view in vertical section on line 5—5 of Figure 1.

Figure 6 is a rear view of a portion of the operating lever.

Figure 7 is a side view thereof showing the same partly in section.

Figure 8 is a view in vertical section on line 8—8 of Figure 1, illustrating the variable speed driving mechanism of my improved transmission.

Figure 9 is a view in side elevation of the forward portion of my improved transmission, illustrating the operating mechanism thereof.

Figure 10 is a detail fragmentary view enlarged, of the oscillating lever adjusting means.

Figure 11 is a rear view, in elevation, of one of the oscillating driving members.

Figure 12 is a view in vertical section on line 12—12 of Figure 1.

Figure 13 is a detail view illustrating the construction of the one way roller clutch used in my improved device.

As illustrated in the drawings, in which like numerals denote like parts in the several views thereof, the numeral 5 denotes the housing of my improved transmission, which is mounted in a suitable manner with relation to a power unit not shown, such as an engine or motor from which power is to be obtained. The numeral 6 denotes an adapter plate which is constructed to fit over a flange 7 of the housing, the outside of which plate is adapted to be secured to the power unit.

My improved transmission is contained mostly within said housing and comprises, a driving member in the form of a shaft 8 and a driven member in the form of a shaft 9 both of which members are rotatably mounted in suitable bearings substantially in the center of said housing, the shaft 9 being connected to the device which is to be driven thru said transmission, such as the conventional propeller shaft of an automobile.

An adjustable cranking unit, denoted generally by the numeral 10, is mounted in said housing at one side thereof and a counter driving unit, denoted generally by the numeral 11, is mounted at the opposite side of the said housing. The said adjustable cranking unit comprises a rotatable member 12 which is mounted in a bearing 13 and rotated by means of a gear 14 which meshes with a pinion 14' on the driving member 8. The said driving gear 14 is secured to the member 12 by means of screws 15, said gear having a hub 16 on which is formed a pinion 17 which meshes with an idler gear 17' that is mounted in a suitable bearing in the housing. The said hub 16 extends thru a ball bearing 18 and is secured to said bearing by means of nuts 19 threaded to the end thereof. The said ball bearing is mounted in a bearing 20 which is also formed in the housing. A bushing 21 surrounds the member 12 and clamps 22 and 23 are provided to respectively clamp the said ball bearing in the bearing 20 and the said bushing in the bearing 13 to rotatably mount the said member 12, gear 14, and pinion 17 in said bearings; the said ball bearing being secured in the bearing 20 in a manner to prevent lateral movement of the gear 14 while the member 12 is permitted to laterally adjust itself in the bearing 13. The clamps 22 and 23 are united by means of tie bars 24 integrally formed with said clamps, at each side thereof, to prevent vibration from the rotation of said member 12 and gear 14 in the bearings.

A sleeve 25 is rotatably mounted in a bearing 26, which is formed in said housing, and supported in said bearing within the split bushing 27 that is clamped on said bearing by means of a clamp 28.

A disc 29 is rotatably mounted in a bearing 30 and supported therein by means of a roller thrust bearing 31 which is secured in said bearing by means of a clamp 32. A hub 33 on said disc extends within a removable bearing 34 that is mounted in the end wall of the housing and the said hub is rotatably supported in said bearing by means of a bushing 35.

An adjustable cranking member 36 is slidably mounted in slots 37 and 38 respectively in the face of the rotating member 12 and the rotatable sleeve 25, and a second adjustable cranking member 39 is slidably mounted in slots 40 and 41 respectively in the faces of the rotatable sleeve 25 and disc 29. Connecting rods 42 and 43 are mounted in a suitable manner to the cranking member 36 and connecting rods 44 and 45 are similarly mounted to the cranking member 39 for the purpose of transmitting an oscillating driving motion to the counter shaft 11 as hereinafter described.

The cranking member 36 is provided with a boss 46 and the rotating member 12 is provided with a boss 47 to which bosses a set of toggle levers 48 and 49 are respectively pivotally connected by means of pins 50 and 51. The said levers are pivotally secured together by means of a tie shaft 52; the middle of this shaft being formed substantially square, as at 53, to fit within an opening 54 in a head at the end of the crank adjusting bar 55 which is in sliding engagement with the boss 47 to prevent lateral movement of the said end by friction during the operation of said toggle levers which would otherwise tend to pull the said end towards the pin 51.

The said bar extends thru the hub 16 of the gear 14 and has, mounted at the ends thereof, a suitable thrust bearing unit 56 through which lateral motion is applied to said adjusting bar by a shifting bar 57 secured to a rocker shaft 58 which is transversely mounted in suitable bearings 59 and 60 in the housing 5.

Each of the adjustable crank members 36 and 39 is provided respectively with apertures 61 and 62 in which are respectively slidably mounted adjusting sleeves 63 and 64. A crank adjusting rocker lever 65 is mounted within the sleeve 25, by means of a pin 66, and said lever extends and is pivotally secured to each of the adjusting sleeves 63 and 64 by means of pins 67 and 68.

The counter driving unit 11 consists of flanged driving pulleys 69 which are mounted and keyed to the counter shaft 70 that is supported in bearings 71 and 72. Oscillating levers 73 are provided, of which I prefer to use one at each side of each of the pulleys 69, and the said levers have elongated openings 74 thru which the said shaft 70 extends and by means of which free rocking motion of the lever on its fulcrum is permitted. Gripping members 75 are pivotally mounted to each of the said oscillating levers, by means of transverse hubs 75', and positioned to engage the outside surfaces of the pulleys 69, at each side of a peripheral rib 69'' on said pulleys for retaining said gripping members in their proper position thereon, and gripping members 76 are also pivotally mounted at an intermediate point on said levers, by means of transverse hubs 76', and positioned to engage the inside surfaces of the said pulleys. Each of said oscillating levers are supported on the pulleys by said gripping members and are provided at their ends, opposite from the said gripping members, with a yoke 77 to which one of the connecting rods 42, 43, 44 and 45 are pivotally connected by means of pins 78 extending thru the said yokes. The distance between the said connections and the centers of the pulleys 69 is greater than the distance between the gripping members and said centers, thus providing a leverage thru said oscillating members for driving said pulleys.

The gripping members 75 and 76 are mounted on said oscillating levers on a line B which is spaced, in a direction opposite the direction of travel of the pulleys, from a radial line C extending thru the centers of said pulleys and gripping member pins 78. The said gripping members 76 are provided with arms 79 which are engaged by springs 80 mounted in sockets 81 that are formed on the oscillating levers 73; the said springs tending to hold the gripping members 76 in contact with the inner surfaces of the pulleys 69 and thus also acting to force the gripping members 75 into contact with the outer surfaces of the pulleys.

Rocker arms 82, which are mounted on the shaft 70, are adapted to engage, by one end thereof, bosses 83 formed on said oscillating levers and the opposite ends of said rocker arms are engaged by silencer springs 84 which are mounted in bosses 85 formed on said oscillating levers. Adjustment screws 86 are threaded to said bosses and adapted to extend thru said silencer springs to engage the end of the rocker arms during the operation of the device. The said adjustment rods are adjusted to be spaced at a slight distance from the ends of the said rocker arms, in order to permit the necessary motion of the oscillating levers to cause the gripping members to grip the pulleys as will be hereinafter described.

Sleeves 87 and 88, which are mounted on the counter shaft 70, are provided to locate the said rocker arms and oscillating levers in their proper positions adjacent the sides of the pulleys 69.

A driving gear 89 and a driving pinion 90 are mounted and keyed to the counter shaft 70 and the said gear and pinion, are provided with hubs which extend into a ball bearing 91 from each side thereof, and secured to said shaft by means of nuts 92 which are threaded to the end of said counter shaft 70. The said ball bearing is mounted in the bearing 72 previously described, and clamped therein by means of a clamping member 93.

The driving pinion 90 is adapted to mesh with a reverse idler gear 94 which is rotatably mounted in a suitable manner, such as in a bearing 95 in the wall of the housing 5.

A pinion 96 is keyed to and slidably mounted on the driven shaft member 9. The said pinion is adapted to engage the driving gear 89 and also to be slid, by means of the shifting lever 97 which is mounted in a bearing 98 in the cover 99 of the housing 5, to a position where it will mesh with the reverse idler gear 94.

A one-way roller clutch gear 100 is rotatably mounted at the opposite end of the counter shaft 70, on a bushing 101, and rotated by the idler gear 17'. The said gear 100 is provided with a recess 102 in the face thereof and a roller clutch member 103, which is also mounted on said shaft on a bushing 104, has a flange 105 which extends into the recess 102 of said gear and is provided with cam surfaces 106. Rollers 107 of different diameters, are contained within the recess 102 and between the said cam surfaces of the flange 105 and the periphery of the recess 102, and a retaining ring 108 is secured, to said gear 100 by means of screws 109, to retain said rollers within said recess.

A clutch collar 110 is slidably mounted on an enlargement 111 of the counter shaft 70, and keyed thereto against rotation thereon. This collar is provided with teeth 112 to engage teeth 113 on the clutch member 103. A clutch shifting lever 114 is mounted and keyed to the shaft 115 which extends thru and is rockingly mounted in a bearing 116 in the side of the housing 5. Pins 117 extend from said shifting lever into an annular groove 118 in said clutch collar, by means of which the said collar is slidably shifted on the counter shaft by the shifting lever 114.

A rocking lever 119 is secured to the shaft 115 and connected at one end, by means of a link 120, to an operating lever 121 which is integral with an operating pedal 122. The opposite end of said lever is connected, by means of a sliding link 119', to a shaft rocking lever 123 which is rigidly secured to the rocker shaft 58.

A hand operating lever 124 is rigidly secured to said shaft 58, by means of a hub 125 which is integrally formed with said operating lever and by means of which hub the said rocker shaft 58 is extended across the driving shaft 8, the said driving shaft extending thru an opening 126 in said hub. The said operating lever 124 extends upwardly from said hub thru the cover 99 of the housing and the slot 127 in the shield 128 which is secured to said cover.

The upper surface of said shield is formed on a radius with the said rocker shaft 58 to provide a sliding surface 129 that is engaged by the shield plate 130 which is slidably mounted on said lever and pressed in engagement with the said surface 129 by means of a spring 131 anchored, at one end thereof, to the said operating lever by means of adjusting nuts 132 threaded to said lever.

In order to retain the said operating lever in the position to which it is manually fixed, I provide a locking mechanism comprising locking pins 133—133 which extend over the surfaces 129. Locking pin camming plates 134—134 are secured to the sides of said operating lever and provide, at their bottom edge, a camming surface 135 which is disposed above said locking pins. Toggle links 136 are secured to said locking pins and pivotally connected together at their opposite ends by means of the toggle pin 137. A sliding bar 138 is slidably mounted in a slot 139 in said lever, and an extension 140 is provided at the lower end of said bar to be engaged by a cam 141 which is rotatably mounted on the operating shaft 58. The said cam is provided with an arm 142 which is connected, by means of a connecting link 143, to an arm 144 extending from the shifting lever 114. The said slide bar is connected to the links 136 by means of the toggle pin 137. A pull rod 145 is connected to said slide bar 138 and a spring 145' is provided to force said slide bar in a downward direction and cause the locking operation of the locking pins 133. Said pull rod extends upwardly, thru a tubular section 146 of the operating lever, to the levers 147 which are pivotally mounted by means of pins 148 in a housing 149 that is mounted at the upper end of the said tubular section 146.

The levers 147 are provided with fingers 150 which are positioned to be engaged by an operating finger 151 extending, between the said fingers 150, from a rocking member 152 which is pivotally secured to the said housing 149 by means of a pin 153.

An operating handle 154 provided with a gripping member 154' is pivotally mounted to said rocking member 152 by means of a hub 155 extending thru said member. A positioning pin 156 is provided in a recess in said operating handle and adapted to be forced, selectively, into positioning notches 157, 158 and 159, in a positioning plate 160 integrally formed on said rocking member 152, by means of a spring 161. Stops 162 and 163 are provided on said positioning plate to limit the movement of said operating handle with relation to said positioning plate.

The shifting lever 97, for shifting the sliding pinion 96 on the shaft 9, is operated by the operating handle 154 by means of the following mechanism. An arm 164 is secured to the hub shaft 165 of the shifting lever 97. A shifting bar 166 is pivotally connected to said arm 164 and extends therefrom to a rocker arm 167 rigidly mounted to a rocker shaft 168 that is mounted on the cover 99 of the housing 5. The said rocker shaft is rockingly supported in a bearing 169 at one end, and the opposite end thereof extends thru a bearing 170 in a guide member 171, which is also mounted on said cover plate. A rocker arm 172 is secured to the end of the said rocker shaft and positioned within the said guide member. A stud 173 extends from the opposite end of said rocker arm and is positioned to be received, within a slot 174, in an operating member 175 whereby the said rocker arm is operated in a manner to be hereinafter described.

The said operating member 175 is mounted on a bar 176, which is slidably mounted in a bearing 177 extending from the shield 130 of the operating lever, and the said bar is connected, at the opposite end thereof, to a rocking bar 178 which is rigidly secured to the hub 155 of the operating handle 154.

The said operating member 175 is provided with a lip 179 which extends therefrom and overlaps an arcular guide flange 180 on the guide member 171. The said flange is provided with a notch 181 for the passage of said lip therethru to permit the operation of the rocker arms 172.

A foot pedal 183 is rotatably mounted on the operating shaft 58 and connected to the conventional type of foot brake mechanism not shown.

The operation of the operating lever will now be described: When it is desired to move the said lever, force is applied to the handle grip 154 in the direction to which the said lever is to be moved. The rocking member will operate one of the levers 150 which will in turn pull on the pull rod 145, thus pulling upwardly on the slide bar 138 and on the toggle links 136. In this manner, the locking pins 133 will be drawn towards the center of the operating lever, at which point the camming surface 135 will permit the pins to be released from the surface 129 and thus allow free movement of said lever. When the pressure on the grip 154 is released, the spring 145' will force the toggle links 136 downwardly and the locking pins outwardly where they will again be wedged against the locking surface 139, by the cam surface 135, and thus automatically lock the operating lever in position.

The shield 130 will move with the said operating lever to seal the slot 127 in order to prevent oil from leaking out of the transmission housing. When the operating lever is moved to its rearmost position, the end of said shield will extend into a recess 182 that is formed in the cover of the housing for that purpose.

Assuming that the said mechanism is in operation with the parts thereof in their relative positions as shown in the drawings, and that the driving shaft 8 is being rotated, thru its connection with the power unit, in the direction shown by the arrow, the operation of my improved transmission mechanism is as follows:

The pinion 14' will drive the gear 14 thus rotating the member 12 which will in turn rotate the entire cranking unit 10 by means of the connections between the said rotating member 12, thru the cranking member 13, the rotating sleeve 25, the cranking member 39 and to the rotating disc 29.

The rotation of the cranking members 36 and 39 about the center of said cranking unit will cause an oscillating motion to be applied to the oscillating levers 73 by means of their connections with said cranking members thru the connecting rods 42, 43, 44 and 45, as will be clearly understood from the illustration shown in Figure 8 of the drawings.

The oscillating motion of said levers will cause the gripping members 75 and 76 to grip the pulleys 69, when moving in the direction shown by the arrow, and to rotate the said pulleys in that direction. When the levers are oscillated in the opposite direction the said gripping members will release their grip on the pulleys and simply move back to take a new grip. By the novel arrangement of the various parts comprised in this transmission mechanism, a continuous pull is affected on the pulleys 69 since there is always at least one of said levers driving the said pulleys when the previous lever lets go. This unbroken rotation of the pulleys is caused especially by means of the connecting rods being so connected that, on each of the cranking members, there is a connecting rod extending to an oscillating member which is operated from one side of the shaft 70, and another connecting rod extending to an oscillating lever which is operated from the opposite side of the said shaft. It will be noted from the drawings that by means of this arrangement, when the rod connected to an oscillating lever at the upper side of the shaft is beginning to pull back on the oscillating lever, the rod connected from the same cranking member to the oscillating member at the lower side of the shaft is still forcing that oscillating member in the forward direction. One of the oscillating levers on each of the pulleys is located so that the gripping members will grip the said pulley near the top thereof, while the other oscillating lever is located so that the gripping members will grip the said pulley at a point near the bottom thereof as shown in Figure 8 of the drawings. Thus the pulleys are rotated in the direction of the arrow, by the pulling motion of the connecting rods 42 and 44 and by the pushing motion of the connecting rods 43 and 45.

When the oscillating levers are moved in their forward or driving, direction, they will rock from a fulcrum between the two gripping members on the line B, thus causing a positive grip on the pulleys. When the said oscillating levers are moved in the rearward, or idle, direction, they will rock from the same fulcrum against the pressure applied by the silencer spring 84, for the distance permitted by the adjusting screw 86 which will cause the said gripping members to release their grip from the pulley. By means of the elongated opening 74, when the oscillating levers are moved in their forward or driving direction, they are free to rock from their fulcrum as far back as necessary to permit the said gripping members to take a firm hold on to the pulleys but, when the said levers are moved in their idle direction, the rocking motion on the said levers is limited by the predetermined distance at which the end of the adjusting screw 86 is set from the end of the rocking lever 82, since, when the oscillating lever is moved in its idle direction, the said screw will engage the rocker lever 82 and cause said lever to rock on the counter shaft 70 and to force the opposite end of the oscillating lever and the gripping members back on the pulley. It will be noted that the said rocker arms are not entirely necessary for the operation of the gripping members on the pulleys but they perform a very valuable function inasmuch as, by their use, excessive motion of the oscillating levers for the releasing of the gripping members is prevented and, consequently, a longer pull is applied on the pulleys by the gripping members. By means of the above described mechanism it has been estimated that there is an overlap of the power strokes of the cranking members of approximately 52°, while there is a substantial overlap of the rotating motion on the pulleys, by the gripping members on the different oscillating levers. This motion varies with relation to the distance of the cranking members from the axis of the cranking unit, but it is always sufficient to cause the unbroken rotation of the pulleys and, consequently, of the counter shaft on which said pulleys are mounted.

The rotation of the counter shaft 70, as above described, will cause the rotation of the driven member 9 by means of the pinion 96 therein and the counter drive gear 89 on the said counter shaft.

In the position shown, the transmission mechanism will deliver power to the driven member at a maximum speed, due to the fact that the cranking members 36 and 39 are adjusted to their maximum throw. If it should be desired to reduce the speed of the said driven member, the operating lever 124 is moved back, rocking the operating shaft 58 and causing the lever 67 to pull on the adjusting bar 55. The said adjusting bar will operate the toggle links 48 and 49 by means of the pin 52 and, one side of said toggle being secured to the rotating member 12 against radial motion, the opposite side of said toggle will move towards the axis of the cranking unit, causing the cranking member 36 to slide on the rotating member 12 towards the center of the cranking member and reducing the cranking motion of said cranking members on the connecting rods and, subsequently, on the oscillating levers.

When the said cranking member 36 is moved, either towards the said axis or away therefrom, a similar motion will be delivered to the cranking member 39 by means of the connection between said members thru the rocking lever 65 in the rotating sleeve 25. Thus, when one cranking member is moved towards the axis of the cranking unit, the opposite member will be moved in the opposite direction but also towards the said axis.

When the counter shaft 70 is rotated under normal operation, the clutch gear 100 is being rotated by means of the connection between the pinion 17 and the idler gear 17' in the same direction as the counter shaft 70 but at a higher speed. Should the driven shaft 9 be rotated faster than it is driven by the gear 89, as would occur under such conditions as when the throttle of an automobile is suddenly released, or the said automobile is traveling down hill, the said driven member 9 would tend to rotate the shaft 70 faster than the said shaft is being driven by the cranking unit 10 and faster than the rotation of the clutch gear 100. The pulleys 69 will then slip thru the gripping members on the oscillating levers, and the camming surfaces 106 will throw the rollers 107 into locking engagement and lock the clutch member 103 to the clutch gear 100, thus preventing the rotation of the counter shaft 70 and, in turn preventing the rotation of the driven shaft 9 at a speed greater than is permitted by the speed of the driving member 8. It will be readily understood therefore that, by this function of the mechanism of my improved transmission, spinning of the power unit by reverse power from the driven device is prevented, and that a braking action is applied to the vehicle by means of the resistance against the rotation of the driven member 9 thru the gears 100, 17', 17, 14 and 14' to the driving member 8.

Again assuming that the transmission mechanism is operating normally, if it is desired to shift the mechanism into what is commonly known as the free wheeling position, the pedal lever 122 will be moved forwardly for a distance about one-half of its throw. This will cause the lever 121 which is integral with the lever 122 to rock the rocker shaft 115, by means of the rocking lever 119, and thus cause the shifting lever 114 to slide the clutch collar 110 backwardly on the shaft 70 so that it will disengage the said shaft from the clutch member 103. The counter shaft 70 is then free of the clutch gear 100 and the driven member 9 is permitted to rotate at a faster forward speed without the resistance, thru the clutch gear 100, which is above described.

Assuming that it is desired to shift the cranking unit into a neutral position by means of the pedal lever 122 instead of by the operating lever 124 as would be desirable in an emergency. The said pedal lever is moved forward, rocking the rocker arm 119 and the rocker shaft 115, and disengaging the clutch collar 110 as above described. The connecting link 143 will rotate the cam 141 to engage the slide bar 138, forcing the bar upwardly, disengaging the locking pins 133 and unlocking the operating lever. The continued forward motion of said rocking lever 119 will then cause the sliding link 119' to engage and operate the rocker arm 123. The said rocker arm, being secured to the operating shaft 58, will rotate said shaft moving the operating lever 124 to its neutral position and at the same time operating the adjusting bar 55, thru the shifting lever 57, in the same manner as the said adjusting bars would be operated by the operating lever 124 to move the cranking members 36 and 39 to their neutral position on the axis of the cranking member 10. Thus, means are provided whereby the said transmission may be quickly operated by the foot pedal, leaving the hands of the operator free for the control of the vehicle.

If it is desired to shift the transmission mechanism so that the driven member 9 will be rotated in a reverse direction, the operating lever 124 is first moved rearwardly, by means of the operating handle 154, to the neutral position. At this position of the said lever, the lip 179 of the operating member 175, will register in line with the notch 181 in the arcular flange 180 and at the same time the operating pin 173 on the lever 172, will be received within the groove 174. The operating handle 154 is then rocked to the position shown in dotted lines, in Figure 6, in which position the positioning pin 156 will engage the positioning notch 159. The movement of said operating lever to the said position will cause the lever 178 to force the operating bar 176 downwardly, thus rocking the lever 172, shaft 168 and lever 167, and operating the shifting bar 166 to shift the pinion 96 on the driven shaft member 9, by means of the shifting levers 164 and 97, to a position where the said pinion will be in engagement with the idler gear 94 and thereby rotate said shaft 9 in the reverse direction.

When it is desired to entirely disconnect the driven shaft 9 so that it will rotate free of the transmission mechanism to permit, for instance, the free manual movement of the machine or vehicle driven thru the said transmission, the operating lever 154 is moved to the position where the positioning pin 156 will engage the notch 158. This will operate the shifting mechanism for the pinion 96 in the manner described, to shift the said pinion to a position between the forward and reverse positions, where it will be out of engagement with either of the gears 89 or 94 thus permitting free rotation of the shaft 9.

By means of my improved transmission mechanism, the cranking unit cannot be driven by the counter driving unit should power be applied to the said counter driving unit in a direction opposite to that of its normal rotation. The mechanism would become locked against reversed rotation, since the reverse motion of the pulleys would tend to lock them to the gripping members on the oscillating levers which cannot be moved as they would be locked in a stationary position by the cranking members. This feature would prevent the backing up of the driven device and is of particular advantage under such circumstances as when an automobile is traveling up hill and the motor becomes stalled, in which case, my improved transmission would lock the vehicle against backward motion as long as the pinion 96 is in mesh with the counter driving gear 89 for the forward rotation of the driven member.

I claim:

1. A cranking unit comprising rotating members, cranking members adjustably mounted to rotate with said rotating members, a crank adjusting mechanism mounted in said rotating members, said adjusting mechanism comprising a toggle joint between one of said rotating members and said adjustable cranking members, an adjusting bar connected to the knee of said toggle joint and longitudinally slidable in said cranking unit, means for operating said adjusting bar, equalizing means mounted in one of said rotating members and connected to said unit for adjusting one of said cranking members with relation to another on said cranking unit, and means for rotating said cranking unit.

2. A cranking unit comprising a plurality of rotating members, adjustable cranking members slidably mounted in said rotating members and adjustable radially thereon, means comprising a toggle mechanism for adjusting said cranking members on said cranking unit, a lever pivotally mounted in one of said rotating members and connected at the ends thereof to each of the said adjustable cranking members for radially adjusting one of said cranking members with relation to the other, and means for rotating said cranking unit.

3. A cranking unit comprising a plurality of rotating members mounted in separate bearings, oppositely disposed slots in said rotating members, radially adjustable cranking members slidably mounted in said slots, means comprising a toggle mechanism for adjusting said cranking members on said cranking unit, and means for rotating said cranking unit.

4. The combination of a cranking unit comprising a housing rotatably mounted, a cranking member adjustably mounted on said housing, a toggle mechanism located within said housing and connected thereto and to said cranking member for variably adjusting said cranking member thereon, a gear connected to said housing whereby the same is rotated, and adjusting bar slidably connected to the knee of said toggle mechanism and extending thru the hub of said gear in fixed axial position and slidable thereon, and means for operating said adjusting bar.

5. In a variable speed transmission mechanism of the character described, a cranking unit comprising a rotatable member, a cranking member adjustably mounted thereon and a toggle mechanism for adjusting said cranking member; said toggle mechanism being anchored pivotally to said cranking member, an operating bar movable on the axis of said rotatable member and slidably connected to the knee of said toggle mechanism, and means in said rotatable member comprising a sliding surface in contact with said bar to support the said bar against lateral movement during the operation thereby of said toggle mechanism.

CHARLES E. BAKER.